United States Patent
McElhannon (10) Patent No.: US 7,373,373 B2
(45) Date of Patent: May 13, 2008

(54) SYSTEMS AND METHODS FOR HOST/CLIENT COMMUNICATIONS

(75) Inventor: James L. McElhannon, Broken Arrow, OK (US)

(73) Assignee: Arinc Incorporated, Annapolis, MD (US)

( * ) Notice: Subject to any disclaimer, the term of this patent is extended or adjusted under 35 U.S.C. 154(b) by 843 days.

(21) Appl. No.: 10/733,340

(22) Filed: Dec. 12, 2003

(65) Prior Publication Data
US 2005/0131985 A1 Jun. 16, 2005

(51) Int. Cl.
*G06F 15/16* (2006.01)
*G06F 17/30* (2006.01)

(52) U.S. Cl. .................... 709/201; 709/203; 707/3; 707/6

(58) Field of Classification Search ........... 709/203, 709/201; 719/313, 320; 715/507; 707/3, 707/6, 101; 706/55
See application file for complete search history.

(56) References Cited

U.S. PATENT DOCUMENTS

| | | | |
|---|---|---|---|
| 5,185,857 A * | 2/1993 | Rozmanith et al. | 715/507 |
| 6,216,164 B1 * | 4/2001 | Zaremba, Jr. | 709/227 |
| 6,446,110 B1 * | 9/2002 | Lection et al. | 709/203 |
| 7,092,940 B1 * | 8/2006 | Ethen et al. | 707/6 |
| 2003/0033287 A1 | 2/2003 | Shanahan et al. | |
| 2003/0033288 A1 | 2/2003 | Shanahan et al. | |
| 2003/0061200 A1 | 3/2003 | Hubert et al. | |
| 2003/0061201 A1 | 3/2003 | Grefenstette et al. | |
| 2003/0069877 A1 | 4/2003 | Grefenstette et al. | |

OTHER PUBLICATIONS

"SGML-based Document Management Tools," *Seybold Report on Publishing Systems*, v24, n17, pS30, May 1, 1995.
Walter, Mark, "Documentum: Open Approach to Automating Workflow and Management of Long Documents," *Seybold Report on Publishing Systems*, v23, n7, p. 3, Dec. 1, 1993.
Robinson, III, Cornell W., "Xcellenet's Afaria Helps Admins Take Control of the Mobile Masses," *Network Computing*, 2001, n 1222, p. 28, Oct. 29, 2001.

* cited by examiner

*Primary Examiner*—Frantz B. Jean
(74) *Attorney, Agent, or Firm*—Oliff & Berridge, PLC (57) ABSTRACT

A method for determining the contents of a host response to a client query by detecting patterns expected in the data displayed in the host response, and outputting the data in the format of the detected pattern to the client. The pattern may be expressed using extensible markup language and regular expressions to form a compact and precise notation for the pattern.

20 Claims, 4 Drawing Sheets

SYSTEMS AND METHODS FOR HOST/CLIENT COMMUNICATIONS

BACKGROUND OF THE INVENTION

1. Field of Invention

This invention relates to systems and methods for communication between a host computer and one or more client computers.

2. Description of Related Art

Many companies make significant investment in information technology, including computer hardware and the software that runs it. The architecture for the computer hardware is often a host computer in communication with a plurality of client computers. Often the host computer is a large complicated mainframe system, which is based on a character user interface ("CUI") as opposed to a graphical user interface or ("GUI"). A typical approach for providing input to the host is to create a front end computer system, one in which the client appears to the host to be a human who is inputting commands at a keyboard. The more difficult part of the communication between the host and the client is how the host's response to the input is to be understood by the client.

In the airline industry, for example, each airline may own and operate its own host in accordance with the host's own syntax and protocols. The host may be used in communication with a variety of clients, where the clients are operated directly by customers or by booking agents. Each of the clients may submit commands to the host, and receive responses from the host via a host response screen. The responses from the host are then displayed by the particular client for its users. The difficult part is interpretation of the data presented in the host response screen and the formatting of this data for use by the client.

The traditional approach to interpretation of the data presented in the host response screen is to use a technique called "screen scraping". During application development, a developer is given the layout of the host response screen that is to be interpreted. This layout includes details such as the length of data fields, how many occurrences of a field can be present, and what the coordinates of each field are (e.g., line and column positions), etc. A parser is developed which "scrapes" the data from the host response screen according to the prescribed layout, and formats the data for use by the application. The application then receives the formatted data, and performs further manipulations with the data.

SUMMARY OF THE INVENTION

If the layout of the data on the host response screen changes, or the order in which the data appears changes, then the parser needs to be adjusted (i.e., the parser is "hard coded"). In situations where the vendor of the host is different than the vendor for the parser, the situation leads to unacceptable complexity of synchronized timings of upgrades of both the host and the parser. The situation is exacerbated when the systems are used 24 hours a day, seven days per week.

A better approach is needed for creating host response parsers, one that is flexible, capable of identifying which screen of data is being handled, and what data it contains.

This invention provides systems and methods for implementing a host/client communications system, which do not parse the characters appearing on a host response screen by their line or column locations (i.e., do not use "hard coding" of the characters).

This invention separately provides systems and methods for a host/client interface, wherein the host response screen is described using very compact and precise notation for representing a series of characters on the host response screen.

The host response screen is described as a series of patterns, which are matched to a pattern file stored in memory of the host response parser. When the parser determines that a match exists between the data displayed on the host response screen and the pattern file, the parser identifies the host response screen according to the matched pattern file, and retrieves the displayed data which occurs in the matched pattern.

This invention separately provides systems and methods for describing the patterns occurring on a host response screen.

This invention separately provides systems and methods for retrieving the data occurring in the patterns on the host response screen.

This invention separately provides systems and methods for formatting of the retrieved data, and returning the formatted data to the application that uses the parser, in a format suitable for that application.

In various exemplary embodiments of this invention, the patterns occurring in a host response screen are defined using a notation called extensible markup language (XML).

In various other exemplary embodiments of this invention, the data occurring in the patterns is defined using regular expressions.

In various other exemplary embodiments of this invention, a method is provided which iterates through the series of host response screens, evaluating each host response screen against patterns defined in one of various XML documents describing the various host screens. Once a pattern is found to match, the resultant data is formatted into a new XML document, the structure of which is based on the patterns defined by the XML for the host response screen, and is returned to the calling application.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

This invention provides systems and methods for interpreting the host response to a command or query coming from a client computer. In one exemplary embodiment of this invention, the host response is interpreted by comparing a host response screen to a data file containing a set of data patterns expected in one of a plurality of possible host response screens. In various exemplary embodiments, the patterns are expressed using XML. The host response screen is identified when the data displayed in the host response screen occurs in the pattern defined by the XML pattern data file. In various exemplary embodiments, each element of the pattern occurring in the XML pattern data file may be found in the host response screen, in order for the host response parser to declare that the host response screen corresponds to the pattern data file.

In various exemplary embodiments, the data occurring in the XML pattern data file can be represented using regular expressions. Regular expressions are terms which represent a range of possible data values, and are recognized as such by regular expression engines produced by various software vendors. Together, the regular expressions and XML provide a compact and precise notation for describing the patterns expected in the various host response screens.

Figure 1:
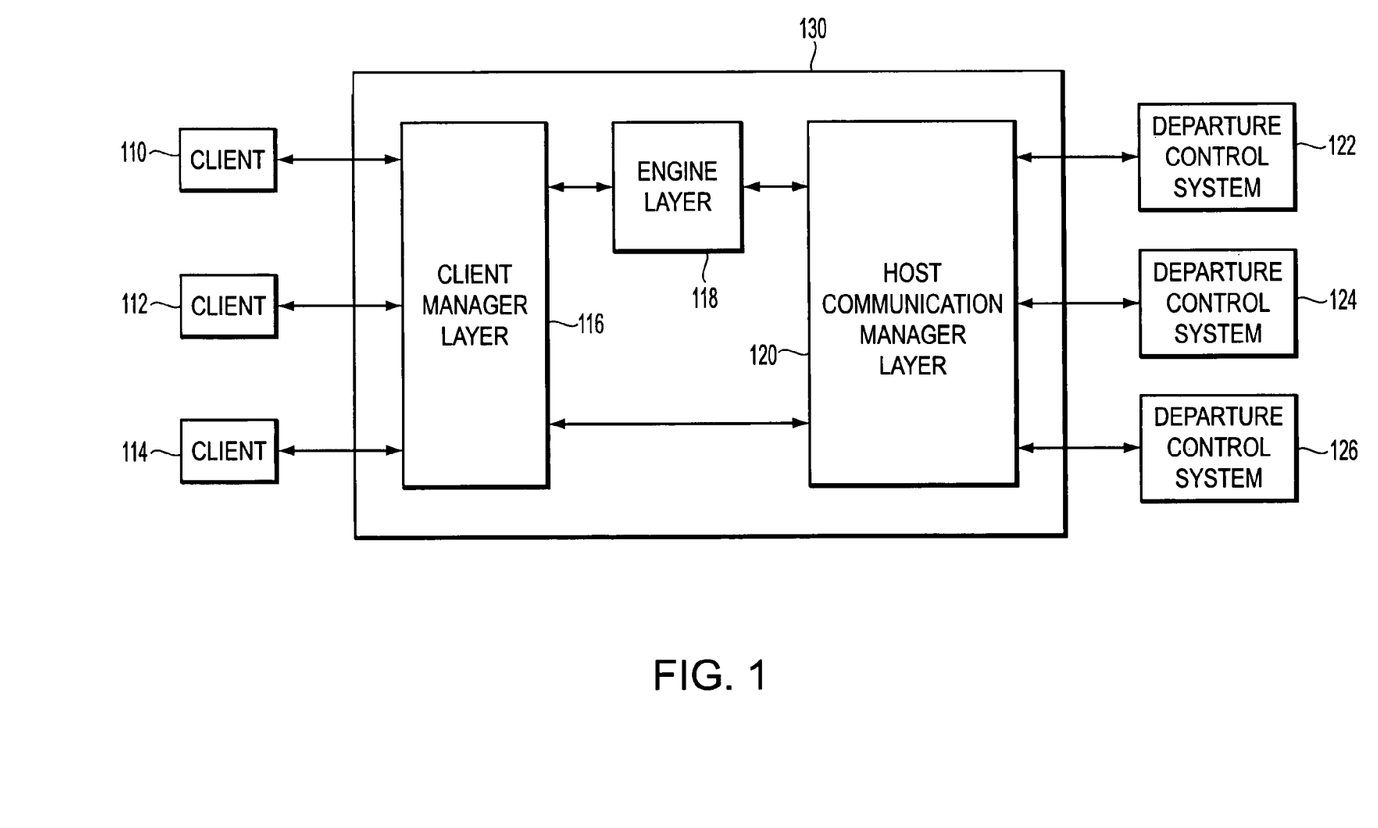
FIG. 1 is a block diagram of an exemplary embodiment of a host/client communications system, showing the overall system architecture, according to this invention.

This invention will be described by reference to an exemplary embodiment pertaining to the airline industry. In this embodiment, multiple host computers belonging to various airlines, such as Delta®, American® and United® need to communicate with a plurality of small client computers. An exemplary system overview is shown in FIG. 1. In various exemplary embodiments, the client computers may be self-help kiosks operated directly by passengers, or terminal emulators operated by booking agents. The client computers are shown as reference numbers 110, 112, and 114 in FIG. 1. Each client computer 110, 112, and 114 is in communication with a host/client interface 130, which is, in turn, in communication with a plurality of departure control systems (DCSs) 122, 124, and 126. Departure control system is the general name given to the systems which check people and baggage onto flights, and, for example, check the weight of the airplane. The DCSs 122, 124, 126 are host computers which are separate entities, owned and operated by the individual airlines, and each may operate according to its own syntax and communication protocol. Therefore, the host computers 122, 124, 126 must be able to receive inquiries or commands from the various client computers 110, 112, 114, and respond to those commands in a way that can be used by the client computers 110, 112, 114. The host/client interface 130 is primarily responsible for translating the client inquiries for the hosts 122, 124, 126, and the host responses for the client computers 110, 112, 114.

In various exemplary embodiments, the host/client interface 130 is further comprised of a client manager layer 116, an engine layer 118 and a host communications manager layer 120.

The client manager layer 116 provides two main functions. First the client manager layer 116 takes the particular client's communication data stream and prepares it for use by other portions of the host/client interface 130. The client manager layer 116 will call any other layers of the host/client interface 130 as needed to service a client request. For example, if the client 110, 112 114 needs functionality implemented in the engine layer 118, the client manager layer 116 will call the appropriate engine layer function and return its response to the client 110, 112, 114. Second, the client manager layer 116 provides any business logic that is necessary to support the client 110, 112, 114 within the host/client interface 130. Typically, this business logic would be a state machine to ensure that the client 110, 112, 114 abides by the rules that are defined for the particular interaction. For example, the client manager layer 116 ensures that a check-in command is properly formed, with the right syntax, and with the correct security features.

The client 110, 112, 114 may transmit a command to the client manager layer 116 using any communication medium necessary to support the client 110, 112, 114, for example, Ethernet, RS-232, RS-422, or other. The client 110, 112, 114 must first successfully log into the client manager layer 116 and to any other layers in the architecture that the client 110, 112, 114 will use. The client 110, 112, 114 then sends the client manager layer 116 a properly formed command. Upon receipt of a valid command from the client 110, 112, 114, that client is not allowed to transmit another command until the response for the outstanding command is transmitted to the client 110, 112, 114. Depending upon the client manager layer 116, attempting to send a second command while the first is still outstanding may be prevented by blocking the client's input queue or may result in an error condition being returned to the client 110, 112, 114.

In various exemplary embodiments, the engine layer 118 is responsible for the mapping of a client command into the collection of specific host commands. The architecture of this layer utilizes "request" and "response" filters to provide the details of the command mapping for a particular host. Using filters will enable a single engine layer implementation to support multiple hosts 122, 124, 126, each with different command sets and with different command formats. The filters perform the translation required to form a proper command in the host command set from the command received from the client 110, 112, 114.

The engine layer 118 will submit the collection of host commands to the host 122, 124, 126 using the communication services provided by the host communications manager layer 120. The engine layer 118 then interprets the specific host response for each command in the collection. To perform this function, the engine layer 118 also contains a host response parser, which will be described in detail below. The engine layer 118 will perform any additional processing to make the host responses usable by the client 110, 112, 114.

The command received from the client 110, 112, 114, having been examined for proper format and security by the client manager layer 116, and translated using the appropriate filter in the engine layer 118, is transmitted from the engine layer 118 to the host communications manager layer 120. The host communications manager layer 129 is the formatter and router which will encode the command and transmit it directly to the host 122, 124, 126, and confirm that the host 122, 124, 126 has received the command. The host communications manager layer 120 provides character translation, for example. (The code letter for the character "A" may be different for Delta® airlines compared to American® airlines, compared to what a PC calls the character "A". The host communications manager layer 120 will change the character "A" from the PC version, as received from the client 110, 112, 114, to the Delta® version, before transmitting to the Delta® host computer in the Delta® departure control system.) The host communications manager layer 120 thereby shields the clients 110, 112, 114 from the details and peculiarities of a particular host communication protocol.

The host communications manager layer 120 will handshake with the host 122, 124, 126 and transmit the command to the host 122, 124, 126. Once the host communications manager layer 120 has transmitted the command to, for example, the Delta® departure control system 122, the Delta® departure control system 122 will respond to the host communications manager layer 120. The host communications manager layer 120 will aggregate characters in the host response from a stream of data to lines of character data, and transmit the response to the engine layer 118 for parsing.

Figure 2:
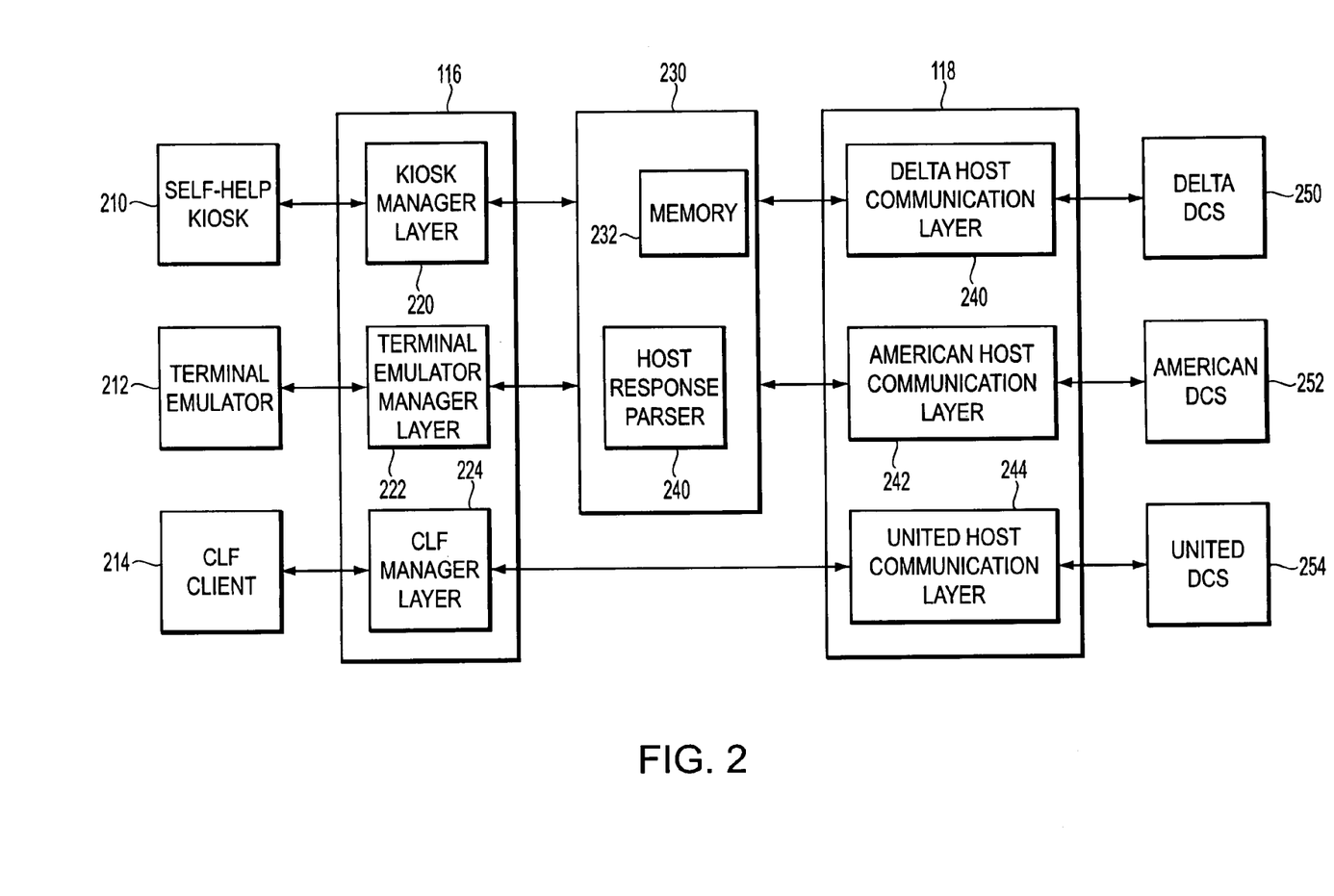
FIG. 2 is a block diagram showing greater detail of the overall system architecture according to this invention.

FIG. 2 shows an exemplary embodiment of the overall system architecture of FIG. 1 in greater detail. For example, as shown in FIG. 2, the client manager layer 116 may actually comprise three separate portions: a kiosk client manager 220, a terminal emulator client manager 222 and a common language facility (CLF) client manager 224. A CLF client is a client which uses a graphical user interface for an agent such that all systems-specific details are hidden. The CLF clients provide a screen which has a consistent display no matter which airline a passenger is flying on. The commands from the CLF client map to the whole series of commands to, for example, American® airlines, United® airlines or Delta® airlines.

Similarly, the host communications manager layer 120 in FIG. 1 may actually comprise three portions 240, 242 and 244 shown in FIG. 2, each dedicated to the particular departure control system 250, 252 and 254. For example, if the departure control system 250 corresponds to Delta® airlines, the departure control system 250 is in communication with the Delta® specific host communications layer 240. Departure control system 252 may correspond to American® airlines which would be in communication with an American® host communications manager layer 242. Departure control system 254 may correspond to United® airlines and be in communication with the United® host communications manager layer 244 within the host communications manager layer 120.

The engine layer 230, as shown in FIG. 2, further comprises a host response parser 240, and a memory 232. The host response parser 240 is primarily responsible for the interpretation of the response from the departure control host systems 250, 252 and 254 via the host communications layer 240, 242 and 244, retrieving data from the response and formatting the data for the client manager layers 220, 222 and 224. the memory 232 stores data files which correspond to the various host response screens which the host is capable of generating.

Figure 3:
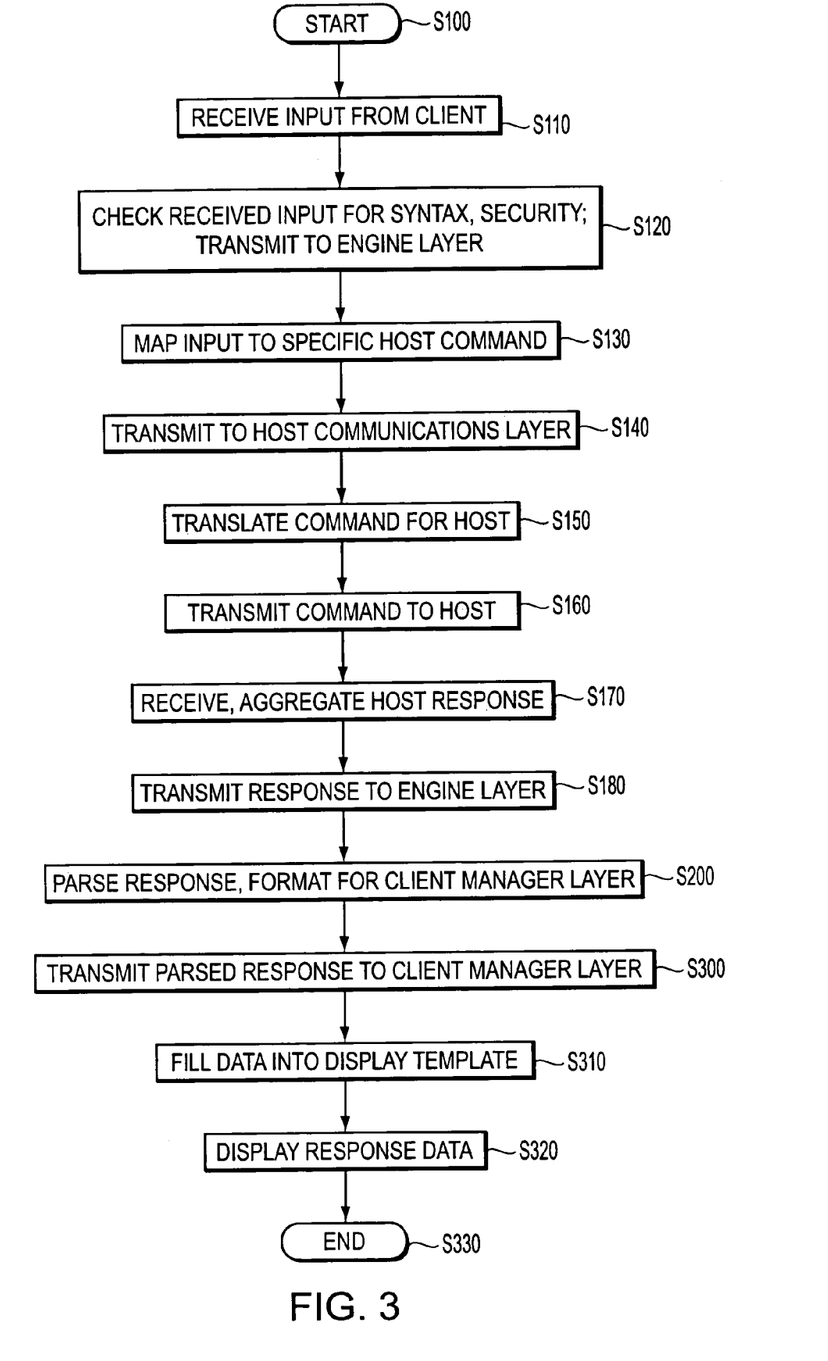
FIG. 3 is a flowchart outlining the operation of one exemplary embodiment of the host/client communications system shown in FIG. 1 according to this invention.

FIG. 3 is a flowchart outlining an exemplary embodiment of a host/client communications method according to this invention. The process begins in step S100 and continues to step S110. In step S110, a command is entered, for example, at a self-service kiosk. In various exemplary embodiments, the command is entered by a customer. In various other exemplary embodiments, the command is entered by an agent. Control proceeds to step S120, where the command is received and the appropriate engine layer function is called. The command is checked for proper syntax and security features in step S120 as well. Next, in step S130, the command is mapped to a specific host command. In various exemplary embodiments, the command is mapped by the engine layer. Then, in step S140, the command is transmitted to the host communications layer. In various exemplary embodiments, the command is transmitted by the engine layer. Next, in step S150, the command is standardized or translated for the specific host, and then transmitted to the host in step S160.

Control continues to step S170, where the response to the command is received from the host, and aggregated for the engine layer. In various exemplary embodiments, the command is received and aggregated by the host communications layer. Next, in step S180, the response is transmitted to the engine layer. In various exemplary embodiments, the response is transmitted by the host communications layer. Then, in step S190 the host response is parsed, formatted and sent to the client manager layer. In various exemplary embodiments, the host response is parsed by the host response parser and formatted, and then transmitted by the engine layer, to the client manager layer in step S200. The received data is then applied to an appropriate template in step S210. In various exemplary embodiments, the data is applied to the template by the client manager layer. Next, in step S220, the formatted data is sent to the client and displayed to the customer or agent. In various exemplary embodiments, the data is formatted and sent to the client by the client manager layer. The process then ends in step S230.

The functioning of the host response parser will first be described generally with reference to FIG. 4 below, and then applied to a particular example, to further demonstrate its functioning. The steps illustrated in FIG. 4 correspond to step S200 of FIG. 3.

Figure 4:
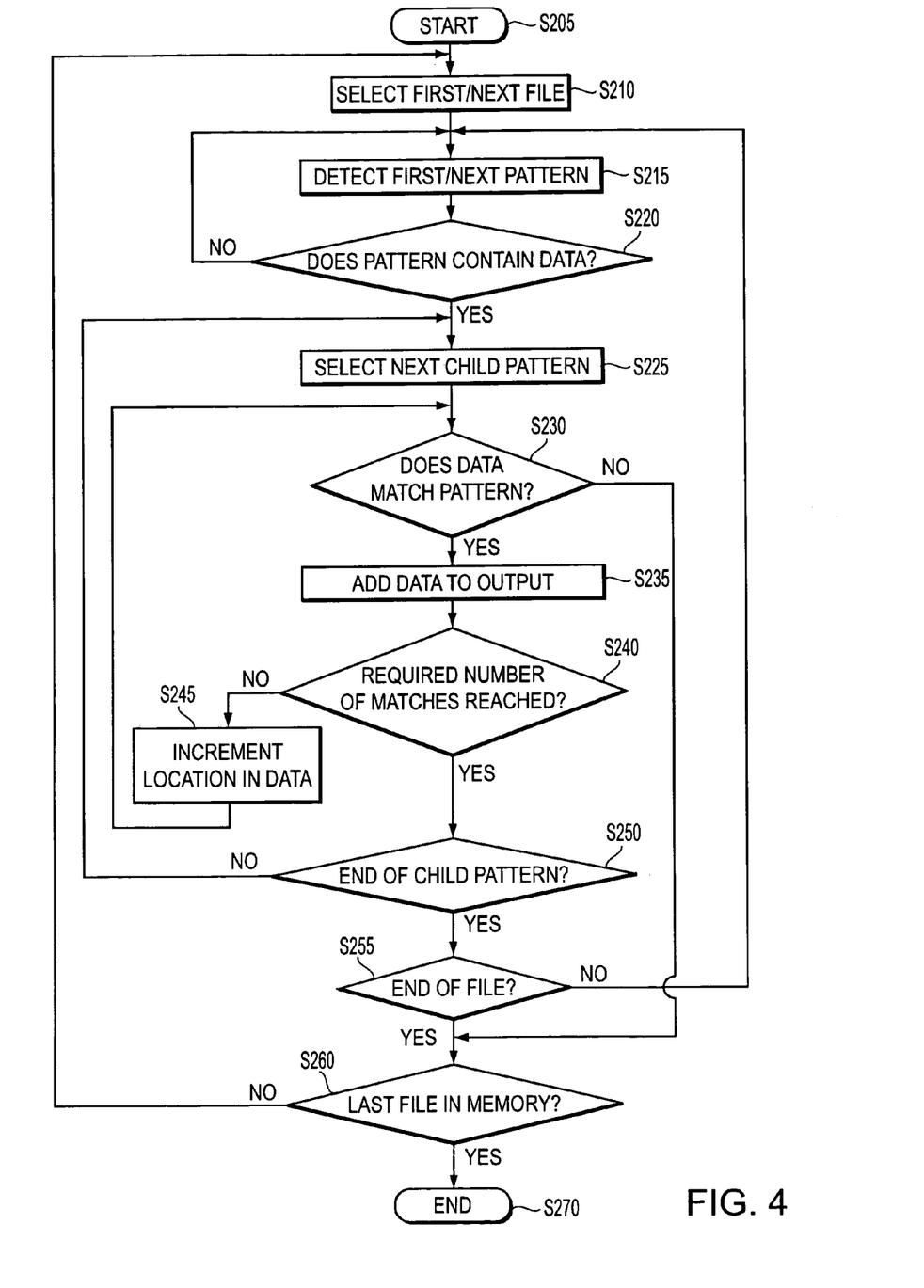
FIG. 4 is a flowchart outlining the operation of one exemplary embodiment of the host response parser according to this invention.

In one exemplary embodiment, before beginning the process described in FIG. 4, a plurality of pattern files are stored in a memory of the engine layer. The files correspond to virtually any response screen that the host system is capable of generating. In step S205 of FIG. 4, a first pattern file is selected, the first pattern in the file is detected in step S215. The pattern is tested in step S220 to see if the pattern contains data. If not, the pattern is discarded and the algorithm returns to step S215 to detect the next pattern in the file. If the pattern does contain data, the algorithm proceeds to step S225, where it selects the next child pattern (pattern within a pattern). The data detected in the host response screen is evaluated to see if it matches the expected child pattern in step S230. If so, the data is added to the output being gathered for return to the client, in step S235. If no match is detected, the algorithm proceeds to see if it is handling the last file in the memory, and if so, exits and returns to step S300 in FIG. 3. If there are additional files in memory, the next file is retrieved in step S210, and the algorithm returns to step S215, to detect the first pattern in the file.

Returning to the point at which a match between the data on the host response screen and the child pattern was detected (step S235) the algorithm determines whether the number of matches required by the child pattern has been reached. If not, the position of the evaluated position in the host response screen is incremented by the length of the match, and the next set of data occurring in the host response screen is evaluated to see if the data matches the expected pattern, in step S230. If the required number of matches has been reached, the algorithm proceeds to determine if the end of the child patterns has been reached in step S250. If not, the next child pattern is selected, and the algorithm returns to step S225. If the end of the child patterns has been reached, the algorithm detects, in step S255, whether the end of the file has also been reached. If not, the next pattern is detected and the algorithm returns to step S215. If so, the algorithm returns to step S260, to see if the file is the last in memory. If so, the algorithm returns to step S300 in FIG. 3. If not, the next pattern file is retrieved in step S210, and the process repeats from step S215.

In various exemplary embodiments, the pattern file may contain a sequence of instructions in extensible markup language (XML) that define the pattern expected in the host response screen. The XML may use regular expressions to represent the elements of the pattern. Regular expressions are terms used by regular expression engines of various vendors, for example, Sun Java® (Regular Expression engine, produced by Sun Microsystems® of Santa Clara, Calif., or Microsoft® Visual Studio™, produced by Microsoft Corporation of Redmond, Wash. The regular expressions are patterns denoted by a sequence of symbols representing a state-machine or mini-program that is capable of matching particular sequences of characters. For example, instead of matching "a word of any length in the lowercase of the English alphabet", the regular expression "[a-z]*" is used. Therefore, the regular expressions are a concise notation which is recognized by the regular expression engine to represent a series of characters of text or data.

XML is a compact notation which defines the pattern to be matched. In order to declare a match, each element of the group specified by the regular expression, must be found in the format defined by the XML, in the host response screen. The XML defines the number of matches expected, the order and arrangement in which they are to occur. The data of the host response screen must match each and every element defined by the XML, in order for the screen to be identified as a match.

TABLE 1

|  |    |                  |   |        |    |                 |   |        |
|--|----|------------------|---|--------|----|-----------------|---|--------|
|1 |    | DL1690/18JUN MCO-M |   |        |    |                 |   |        |
|2 | 01 | 01MACK/ANTHONY   |   |        | 02 | 01MADDOX/DON    | X | MCOATL |
|3 | 03 | 01MADDOX/DON     | X | MCODFW | 04 | 01MADDOX/DON    | X |        |
|4 | 05 | 01MAHADKAR/PAL   |   |        | 06 | 01MAIDEN/SHAWN  |   |        |
|5 | 07 | 01MALHOTRA/HAR   |   |        | 08 | 01MALHOTRA/VEE  |   |        |
|6 | 09 | 01MANFORD/RONA   |   |        | 10 | 01MARCOS/CHIHW  |   |        |
|7 | 11 | 01MARSHALL/PHI   | X |        | 12 | 01MARSHALL/PHI  | X |        |
|8 | 13 | 01MARSHALL/PHI   | X |        | 14 | 01MARTIN/ERICD  |   |        |
|9 | 15 | 01MARUBBIO/ART   |   |        | 16 | 01MATHEWS/WAYN  |   |        |
|10| 17 | 01MAU/ROBERTW    |   |        | 18 | 01MAYER/ANGELA  | X |        |
|11| 19 | 01MAYER/ANGELA   |   |        | 20 | 01MAYER/DANIEL  | X |        |
|12| 21 | 01MAYER/DANIEL   |   |        | 22 | 01MCCARTHY/CHR  |   |        |
|13| 23 | 01MCCARTHY/CHR   | X |        | 24 | 03MCCARTY/JAY/  |   |        |
|14| 25 | 01MCCONNELLLOB   |   |        | 26 | 01MCCONNELLLOB  | X |        |
|15| 27 | 01MCCOY/JMIKE    |   |        | 28 | 01MCCULLOCH/JU  |   |        |
|16| 29 | 01MCELROY/JACK   | X |        | 30 | 01MCENTEE/MICH  | X |        |
|17| 31 | 01MCGAHAN/MICH   |   |        | 32 | 01MCGAHAN/MICH  | X |        |
|18| 33 | 01MCGAHAN/MICH   | X |        | 34 | 01MCKENNA/BETH  |   |        |
|19| 35 | 01MCKENNA/BETH   | X |        | 36 | 01MENYHART/GRE  |   |        |
|20| 37 | 01MENYHART/GRE   | X |        | 38 | 01MEYER/HOLGER  | X |        |
|21| 39 | 01MIDDLEMIS/TO   | X |        | 40 | 01MIDDLEMIS/TO  |   |        |
|22| 41 | 01MILLER/GRACE   | X |        | 42 | 01MILLER/GRACE  | X |        |
|23| 43 | 01MILLER/GRACE   | X |        | 44 | 02MILLER/GRACE  | X |        |
|24| 45 | 01MILLER/JAMES   | X |        | 46 | 01MILLER/JAMES  | X |        |
|25| 47 | 01MILLER/JAMES   |   |        | 48 | 01MILLIGAN/LIS  | X |        |
|26| 49 | 01MILLS/JONATH   |   |        | 50 | 02MISIR/CHANDI  | X |        |
|27| 51 | 01MISIR/RAJMAT   | X |        | 52 | 01MISIR/RAJMAT  |   |        |
|28| 53 | 03MISIR/RAJMAT   | X |        | 54 | 01MISIR/RAJMAT  | X |        |
|29| 55 | 01MISIR/VIJ      | X |        | 56 | 01MISIR/VIJ     | X |        |
|30| 57 | 01MISIR/VIJ      |   |        | 58 | 01MODLINGER/KU  | X |        |
|31| 59 | 01MOORE/NORMAJ   |   |        | 60 | 01MOORE/PAULJ   | X |        |
|32| 61 | 02MOORMAN/MARI   | X |        | 62 | 01MORGAN/CYNTH  |   |        |
|33| 63 | 01MORGAN/JOHN    | X |        | 64 | 05MORGAN/MICHA  | X |        |
|34| 65 | 04MORGAN/MICHA   | X |        | 66 | 01MORGAN/ULTIM  | X |        |
|35| 67 | 01MORGAN/WILLI   |   |        | 68 | 01MORRIS/LEEAN  |   |        |
|36| 69 | 01MORRIS/ROBER   |   |        | 70 | 01MORROW/FINLA  |   |        |
|37| 71 | 01MOSLEY/DEBRA   |   |        | 72 | 01MTEMP/MNAME   | X |        |
|38| 73 | 01MTEMP/MNAME    | X |        | 74 | 01MTEMP/MNAME   | X |        |
|39| 75 | 01MUELLER/ELAI   |   |        | 76 | 01MUNDELEIN/CH  |   |        |
|40| 77 | 01MUNDELEIN/CH   |   |        | 78 | 01MUNDELEIN/EL  |   |        |

TABLE 1-continued

| | | | | | |
|---|---|---|---|---|---|
| 41 | 79 | 01MUNDELEIN/KA | | 80 02MUSAMTO/HEAT | X |
| 42 | 81 | 01MYERS/KRISTO | X | | |
| 43 | END OF LIST - CK WL | | | | |

An example of the functioning of the exemplary embodiments of the algorithms described by FIGS. 3 and 4, will be described next. The process may begin by having an agent operating a common language facility client, submit a request to the client manager layer for all passengers flying on a particular Delta® flight having a last name beginning with the letter "M". The CLF client manager layer checks the request for proper syntax and security clearance, and transmits it to the engine layer, which maps the request into a set of host-specific commands, and transmits it to the host communications manager layer. The host communications manager layer formats the command properly to send it to the Delta® airlines departure control system. The Delta® airlines departure control system retrieves the correct data, and transmits it back to the host communications manager layer. The host communications manager layer organizes the response, and transmits it to the host response parser for parsing. The response data is organized as though it were to be displayed on a terminal screen of the Delta® mainframe computer or host, and therefore in the discussion to follow, the data is referred to as a "host response screen".

A typical host response screen is displayed in lines 1-43 of Table 1. This screen shows real world data for Delta®) airlines flight 1690 on 18 Jun. 2003. The screen shows response to the query for the list of all passengers on this flight whose surname begins with the letter "M". The host responds with the 81 matches as shown.

The job of the host response parser is to interpret this screen, identify it as a similar names list, retrieve the data, and format the data for the CLF client manager layer.

Line 1 shows the flight number (DL1690) followed by a separator (/), followed by the departure date (18 June), followed by the departure city (MCO, which is Orlando, Fla.). The "M" shows the letter that was matched from the query. The remainder of the spaces are not relevant here and may be ignored.

The passenger list begins on line 2 and ends on line 42. The parties are displayed in a table of two columns. The information displayed for each party is as follows: two digits representing the index number (the counter displayed in front of each party); a space; two digits representing the number of passengers in this party; the surname (variable length, with length greater than 0); a slash, which is the separator between the surname and the first name; the first name for the party (variable length, truncated to approximately 14 characters). After the last row in the passenger list, the end of list message is displayed.

Among the pattern files stored in memory of the engine layer, is a pattern file written in XML which corresponds to a similar names list. This pattern file describes the output expected from a query for a list of passengers whose names are similar to a given input letter. The XML pattern file for the similar names list is shown in lines 44-74 of Table 2. This file contains three patterns. The first pattern is contained on line 45. There are no pattern elements in this pattern, and therefore the pattern is empty and is shown for reference only. The second pattern is shown on lines 46-72. This pattern has the element name "SimilarNameList", which identifies the pattern to follow as corresponding to a similar names list output by the host. The patterns listed on lines 48-71 match the host response screen lines 1-42 shown earlier in Table 1. The third pattern is contained on line 73. Like the first pattern, this pattern is empty and is shown for reference only.

TABLE 2

```
44  <HostResponses>
45    <HostResponse Name="EmptyExample1"></HostResponse>
46    <HostResponse Name="SIMILAR-NAME-LIST">
47      <HostResponseElement Name="SimilarNameList">
48        <HostResponseElement Pattern="[A-Z]{2}" Name="Carrier" toClient="carrier" />
49        <HostResponseElement Pattern="\d*" Name="FlightNumber" toClient="flightNumber" />
50        <HostResponseElement Pattern="/" Name="DiscardText1" />
51        <HostResponseElement Pattern="[\d]{2}[A-Z]*" Name="Date" toClient="date" />
52        <HostResponseElement Pattern="[\S\s]*?-" Name="DiscardText2" />
53        <HostResponseElement Pattern="[A-Z]*" Name="PassengerSimilarName" />
54        <HostResponseElement Pattern="\s*-" Name="DiscardedText3" />
55        <HostResponseElement Name="SimilarNames" MinOccurs="1" MaxOccurs="*" toClient="paxIdTable/rows">
56          <HostResponseElement Name="SimilarName" MinOccurs="1" MaxOccurs="1" toClient="row">
57            <HostResponseElement Pattern="\s*" Name="DiscardedText4" MinOccurs="0" MaxOccurs="1" />
58            <HostResponseElement Pattern="[\d]{2}" Name="PositionInList" toClient="column" />
59            <HostResponseElement Pattern="[\s]{1}" Name="DiscardedText5" />
60            <HostResponseElement Pattern="[\d]{2}" Name="NumberOfPassengersInParty" />
61            <HostResponseElement Pattern="[\s\S]{12}" Name="PassengerFullName" toClient="column" />
62            <HostResponseElement Pattern="[\sX]*" Name="IsPnrBad" MinOccurs="0" />
63            <HostResponseElement Pattern="[\s]*" Name="DiscardedText6" MinOccurs="0" MaxOccurs="1" />
64            <HostResponseElement Pattern="[A-Z]{1,3}" Name="BoardPoint" MinOccurs="0" toClient="column" />
65            <HostResponseElement Pattern="[A-Z]{1,3}" Name="DeBoardPoint" MinOccurs="0" toClient="column" />
66          </HostResponseElement>
67          <HostResponseElement Pattern="(\s*-)|(\s*)" Name="AnyLeftOverSpaces" MinOccurs="0" MaxOccurs="1" />
68        </HostResponseElement>
```

TABLE 2-continued

```
69        </HostResponseElement>
70        <HostResponseElement Pattern="[\S\s](19)" Name="EndOfList" />
71        <HostResponseElement Pattern="[\s\S]*" Name="AnyLeftOverText" />
72      </HostResponse>
73      <HostResponse Name="EmptyExample2"></HostResponse>
74    </HostResponses>
```

The parser operates by iterating through each pattern in the file until it either exhausts the list or finds a match, whichever comes first. For each pattern in the file, the parser begins on the first character of the first line of the host response screen. To be considered a match, every character contained in the host response screen should be matched by the elements of exactly one pattern according to the pattern's quantity constraints.

As shown in FIG. 4, the process begins in step S205 and continues to step S210. In step S210, a file is selected.

Next, the first pattern in the file is detected in step S215. Then, the pattern is evaluated in step S220 to see if it contains data. If it does not contain data, the pattern is discarded and control returns to step S215 to detect the next pattern in the file.

For example, the next pattern is selected as the second pattern in the SimilarNameList file shown in Table 2. This pattern does contain data so that control continues from step S220 to step S225, where the first child element of this pattern that contains a "pattern" attribute is selected. The first child pattern is shown on line 48, which is "[A-Z] {2}". This pattern is a regular expression which uses a variation of algebraic set notation to define the matching elements. This pattern defines the allowable set of matching characters to be any sequence of exactly two characters from the letters A-Z (in upper case only) that begins at the current position. The host data at the current position (DL1690) is evaluated against this pattern.

Next, in step S230, the first two characters of the host data are determined to match the pattern. Therefore, the "DL" is extracted from the host response screen and added to the output in step S235 to be returned to the client application. Line 78 of Table 3 shows the exemplary results as formatted for the client. The current position is progressed by the length of the match so it now rests at the data beginning with 1690.

Control then proceeds to step S240, where it is determined whether the number of matches required by the pattern have been detected. If not, the location in the host response screen is incremented in step S245. Control then returns to step S230 to detect additional matches. When the required number of matches has been detected, control proceeds to step S250, where it is determined whether the list of child patterns has been exhausted. If not, control returns to step S225. This continues until the last child pattern has been checked.

Control proceeds to step S255, where it is determined whether the end of the file has been reached. If not, control returns to step S215 to detect the next pattern. If so, control continues to step S260.

In step S260, it is determined whether the last file in memory has been reached. If not, control returns to step S210, where the next file is retrieved. Control then proceeds to step S215 to process the next file.

If the last file in memory has been reached, control jumps from step S260 to step S270, where the process ends.

It will be clear to one skilled in the art, that any number of additional child patterns can exist as subroutines of the algorithm shown, and indicated by additional, further indentations in the pattern data file shown in Table 2. These additional child patterns would be illustrated as nested loops, within the loops shown in FIG. 4. As such, FIG. 4 is only one of many possible exemplary embodiments employing the techniques disclosed here.

Since in step S250, additional child patterns were indicated to be present in this pattern data file, the next child pattern is selected in step S225. This child pattern is shown on line 49. This pattern calls for a predefined set, using the regular expression [\d], which corresponds to the natural digits 0-9 as its basis and specifies that the match can be any length, by using the asterisk *. The asterisk indicates that the match can be zero or more characters in length. "1690" matches this pattern, so it is identified as the variable "flightNumber". The flight number is formatted as shown on line 79 and the current position is advanced to the "/" character.

```
75
76    <SIMILAR-NAME-LIST>
77      <SimilarNameList>
78        <Carrier toClient="carrier" Len="2" Offset="0">DL</Carrier>
79        <FlightNumeber toClient="flightNumber" Len="4" Offset="2">1690</FlightNumber>
80        <DiscardText1 Len="1" Offset="6">/</DiscardText1>
81        <Date toClient="date" Len="5" Offset="7">18JUN</Date>
82        <DiscardText2 Len="5" Offset="12"> MCO-</DiscardText2>
83        <PassangerSimilarName Len="1" Offset="17">M</PassangerSimilarName>
84        <DiscardedText3 Len="47" Offset="18">                              -</DiscardedText3>
85        <SimilarNames toClient="paxIdTable/rows">
86          <SimilarName toClient="row">
87            <DiscardedText4/>
88            <PositionInList toClient="column" Len="2" Offset="65">01</PositionInList>
```

-continued

```
 89            <DiscardedText5 Len="1" Offset="67"/>
 90            <NumberOfPassengersInParty Len="2" Offset="68">01</NumberofPassengersInParty>
 91            <PassengerFullName toClient="column" Len="12" Offset="70">MACK/ANTHONY</PassengerFullName>
 92            <IsPnrBad Len="16" Offset="82"/>
 93            <DiscardedText6/>
 94            <BoardPoint toClient="column"/>
 95            <DeBoardPoint toClient="column"/>
 96        </SimilarName>
 97        <AnyLeftOverSpaces/>
 98        <SimilarName toClient="row">
 99            <DiscardedText4/>
100            <PositionInList toClient="column" Len="2" Offset="98">02</PositionInList>
101            <DiscardedText5 Len="1" Offset="100"/>
102            <NumberOfPassengersInParty Len="2" Offset="101">01</NumberOfPassengersInParty>
103            <PassengerFullName toClient="column" Len="12" Offset="103">MADDOX/DON     </PassengerFullName>
104            <IsPnrBad Len="4" Offset="115">   X </IsPntBad>
105            <DiscardedText6/>
106            <BoardPoint toClient="column" Len="3" Offset="119">MCO</BoardPoint>
107            <DeboardPoint toClient="column" Len="3" Offset="122">ATL</DeboardPoint>
108        </SimilarName>
109        <AnyLeftOverSpaces Len="5" Offset="125">     -</AnyLeftOverSpaces>
110        <SimilarName toClient="row">
111            <DiscardedText4/>
112            <PositionInList toClient="column" Len="2" Offset="130"><03</PositionInList>
113            <DiscardedText5 Len="1" Offset="132"/>
114            <NumberOfPassengersInParty Len="2" Offset="133">01</NumberOfPassengersInParty>
115            <PassengerFullName toClient="column" Len="12" Offset="135">MADDOX/DON </PassengerFullName>
116            <IsPnrBad Len="4" Offset="147">   X </IsPnrBad>
117            <DiscardedText6/>
118            <BoardPoint toClient="column" Len="3" Offset="151">MCO</BoardPoint>
119            <DeBoardPoint toClient="column" Len="3" Offset="154">DFW</DeBoardPoint>
120        </SimilarName>
121        <AnyLeftOverSpaces Len="6" Offset="157"/>
122        <SimilarName toClient="row">
```

The next child pattern on line 50 is now examined. This child pattern contains the literal character "/", which defines that single character as the only allowable match. This character is added to the output as shown on line 80.

The child pattern on line 51 is now examined. This child pattern calls for any two digits of natural numbers [\d] {2}, followed immediately by any number of letters [A-Z]*. "18 June" is the data at the current position on the host response screen, which matches. It is identified as the variable "date". The date is formatted as shown on line 81, and added to the output.

The child pattern on line 52 is now examined. This child pattern uses two predefined sets, the set of white space characters (/s), and the set of non-white space characters ("/S") which is simply the "not" of the "/s" set. Together these two patterns match every possible character. The "*" allows for any number of matches to occur but the "?" qualifier tells the parser to require only the minimum number of matches. Following the match of the characters, a "-" must be found. The data "<space>mco-" matches this pattern so it is added to the output as shown on line 82.

The child pattern on line 53 is now examined. This child pattern calls for any number of capitalized letters between A and Z to occur, and identifies this data as the PassengerSimilarName attribute. This is the data that the host machine matched when producing the host response screen shown in Table 1. The data is formatted as shown in line 83, for output to the client.

The child pattern on line 54 of the pattern file is now examined. This child pattern allows for any number of all white space characters to be present up to a carriage return, denoted by a "~". The "~" is often used as a delimiter between lines and it can be ignored here. In various other exemplary embodiments, the host data would not contain carriage returns as it does here, since readability is not important to the parser's operation. This data matches, so the remainder of the data shown on line 1 is added as shown on line 84.

The child pattern beginning on line 55 is composed of a set of patterns as shown in lines 56-66. Each of those elements is composed of a set of data shown in lines 57-65. For a match to be found, every element listed in lines 57-65 must be found. Either the entire set matches or none of it matches. The output on lines 85 and 86 correspond to the hierarchical structures given in lines 55 and 56.

The child pattern on line 57 is evaluated. This child pattern essentially removes any spaces that may be present at the start of the data. In this case, there are none. This is allowed as the "*" quantifier allows for zero or more matches. This data is added to the result as an empty node as shown on line 87.

Two digits as shown on line 58 are expected and found. This data is identified as corresponding to the variable "PositionInList". The data is formatted and added to the output as shown on line 88.

One space as shown on line 59 is expected and found. The data is added to the output as shown on line 89.

Two digits as shown on line 60 are expected and found. The data is identified as corresponding to the variable "NumberOfPassengersInParty". The data is formatted and added to the output as shown on line 90.

The passenger's name is now expected as a sequence of any 12 characters. (line 61). The data is identified as corresponding to the variable "PassengerFullName". The data is formatted and output as shown on line 91.

Any number of characters from the set of white space and "X" are matched (line 62). Note the "X" is optional as it is inside of the set. The data is formatted as shown on line 92.

A white space is removed. (lines 63 and 93).

Three letters are expected and found (line 64). The data is identified as corresponding to the variable "BoardPoint". The data is formatted and output as shown on line 94.

Three letters are expected and found (line 65). The data is identified as corresponding to the variable "DeBoardPoint". The data is formatted and output as shown on line 95.

A full "similar name record" has been found. Any remaining spaces are removed by line 67. The process now iterates the remaining 80 names, by returning to the beginning of the child pattern defined by the first line prior to the indentation on line 56. As described above, this iteration corresponds to steps S225 to step S250 in FIG. 4. When the end of the child pattern list is encountered, the process returns to the next pattern in step S215. When the "EndOfList" pattern shown in line 70 is matched, the end of the pattern file has been reached in step S255, and the matching of the pattern file to the similar names list is completed. The remaining pattern files stored in memory are then searched, in step S210, to look for any additional matches. After the last pattern file has been tested, the process of FIG. 4 ends and control returns to step S300, as illustrated in FIG. 3.

By finding a successful match between the pattern file and the host response screen, the data from the host response screen is identified as a "SimilarNameList", and the data is returned to the client manager layer with this header. The engine layer transmits this information as an XML document to the client manager layer, for example, in step S300 of FIG. 3.

The client manager layer formats this XML document into a graphical screen by placing the data into a table for graphical output, for example, in step S310 of FIG. 3. For example, the client manager layer will recognize the "SimilarNameList" header on the data, and pull up the "SimilarNameList" template suitable for displaying the data, insert the data into the template and transmit the information for display by the client. The results of the query are then displayed, for example, in step S320 of FIG. 3.

Because the host response parser operates based on pattern recognition rather than hard coded locations of the data on a host response screen, it can adapt to changes in the screen output format. For example, if the host sends a blank line under the flight number on a screen, a simple change to the algorithm can accommodate the presence of the blank line. Because the patterns are defined in an XML file, this file can be easily updated to accommodate changes in the details of the format of the host response screen. The program which reads in, and applies, the XML file does not need to be updated, but only the XML configuration file changes.

Another advantage of the pattern recognition approach is that variable length matches located inside other variable length matches can be handled by the host response parser. This scenario would be very difficult for a parser using the usual hard coded approach. The embodiment of the invention described above uses regular expressions and extensible markup language to form a compact and precise notation for describing patterns expected on a host response screen. This approach is useful for any program to program integration, particularly where one of the systems appears to another system as a person typing at a keyboard. Such situations include hotel, car, airline reservations, banking kiosks which access multiple banks, and e-commerce systems which place orders to multiple different vendors.

While this invention has been described in conjunction with the exemplary embodiments outlined above, it is evident that many alternatives, modifications and variations will be apparent to those skilled in the art. For example, the invention has been described with reference to an application within the airline industry. However, one of ordinary skill in the art will appreciate that the techniques disclosed herein may be applied to other situations, particularly those in which a host mainframe computer must communicate with a plurality of client units, which in turn communicate with a plurality of host mainframe computers. The exemplary embodiments have also been described which make use of regular expressions to indicate a range of expected values within a pattern. However, other symbols may alternatively be used, as long as the symbols are recognized by the parser as corresponding to the intended range of values. Extensible markup language is used in the exemplary embodiments, to express the patterns expected in the host response screen. However, other languages may be used which can express patterns in a compact and precise way. Accordingly, the exemplary embodiments of the invention as set forth above are intended to be illustrative, not limiting. Various changes may be made without departing from the spirit and scope of the invention as defined in the following claims.

What is claimed is:

1. A method for translating data in a host response into a format for use by a client, comprising:
   defining at least one pattern expected to occur in the host response;
   detecting a pattern in the host response that matches the at least one defined pattern;
   determining that the detected pattern contains data;
   selecting a child pattern within the at least one defined pattern;
   determining whether the data contained in the detected pattern matches the child pattern; and
   outputting the data contained in the detected pattern of the host response in a format usable by the client based on the determined match with the child pattern.

2. The method of claim 1, wherein defining at least one pattern further comprises defining patterns by using a plurality of regular expressions to represent the data of the host response.

3. The method of claim 1, wherein defining at least one pattern further comprises using extensible markup language.

4. The method of claim 3, wherein defining at least one pattern further comprises using regular expressions to represent the data of the host response.

5. A computer-readable storage medium, the storage medium storing a data file executable by a computer to cause a computer to execute a method comprising:
   defining at least one pattern expected to occur in the host response;

detecting a pattern in the host response that matches the at least one defined pattern;

determining that the detected pattern contains data;

selecting a child pattern within the at least one defined pattern;

determining whether the data contained in the detected pattern matches the child pattern; and outputting the data contained in the detected pattern of the host response in a format usable by the client based on the determined match with the child pattern.

6. The computer-readable storage medium according to claim 5, wherein the at least one defined pattern is defined using extensible markup language, and wherein the at least one defined pattern is expressed using a plurality of regular expressions.

7. A host/client interface system, comprising:

at least one host computer;

at least one client computer;

a host/client interface computer which operates to receive input commands from the client computer, transmit the commands to the at least one host computer, and receive host responses to the command; and a host response parser, which retrieves the data from the host responses by comparing the host response with an expected data pattern, and when the host response matches the data pattern, retrieves the data from the host response and formats the data according to the matched pattern.

8. The host/client interface system of claim 7, wherein the host/client interface computer further operates to translate the input commands into a format usable by the host computer.

9. The host/client interface system of claim 7, wherein the host/client interface computer further operates to retrieve data from the host responses.

10. The host/client interface system of claim 7, wherein the host/client interface computer further operates to format the retrieved data into a form usable by the client computer.

11. The host/client interface system of claim 7 wherein elements of the data pattern are expressed using regular expressions, and the data pattern is expressed using extensible markup language.

12. The host/client interface system of claim 7, wherein the at least one host computer is a host mainframe computer operated by a commercial service provider.

13. The host/client interface system of claim 12, wherein the commercial service provider is at least one of an airline, a car rental agency, a hotel, and a bank.

14. The host/client interface system of claim 7, wherein the at least one client computer comprises at least one of a self-service kiosk, a terminal emulator, or a common language facility client computer.

15. The host/client interface system of claim 14, wherein the self-service kiosk is operated by customers.

16. The host/client interface system of claim 14, wherein the terminal emulator is operated by booking agents for a commercial service provider.

17. The host/client interface system of claim 16, wherein the commercial service provider is at least one of an airline, a car rental agency, a hotel, and a bank.

18. The host/client interface system of claim 7, wherein the host/client interface computer further includes a client manager layer portion, which accepts input from the at least one client computer.

19. The host/client interface system of claim 7, wherein the host/client interface computer further includes a host communications layer portion, which translates client commands into commands understood by the host computer.

20. The host/client interface system of claim 7, wherein the host/client interface computer further comprises a memory which stores the data patterns expected in the host responses.

* * * * *